United States Patent [19]

Thomson et al.

[11] Patent Number: 5,410,155

[45] Date of Patent: Apr. 25, 1995

[54] SCINTILLATION COUNTING MEDIUM AND PROCESS

[75] Inventors: James Thomson, Bedum; Jan ter Wiel, Loppersum, both of Netherlands

[73] Assignee: Packard Instrument, B.V., Netherlands

[21] Appl. No.: 209,432

[22] Filed: Mar. 10, 1994

[30] Foreign Application Priority Data

Mar. 11, 1993 [EP] European Pat. Off. ............ 93200718

[51] Int. Cl.$^6$ ....................... G01T 1/204; C09K 11/06
[52] U.S. Cl. ................................. 250/364; 252/301.17
[58] Field of Search ........................... 250/364, 361 R; 252/301.17, 301.16, 301.18

[56] References Cited

U.S. PATENT DOCUMENTS

| | | |
|---|---|---|
| 2,985,593 | 5/1961 | Broderick et al. |
| 3,010,908 | 11/1961 | Broderick et al. |
| 3,068,178 | 12/1962 | Kallmann et al. |
| 3,356,616 | 12/1967 | Sandler et al. |
| 3,457,180 | 7/1969 | Kretz et al. |
| 3,491,235 | 1/1970 | Millikan . |
| 3,646,346 | 2/1972 | Catt . |
| 3,814,967 | 6/1974 | Takata et al. |
| 3,886,082 | 5/1975 | Hyman . |
| 3,992,158 | 11/1976 | Przybylowicz et al. |
| 4,000,252 | 12/1976 | Kosak . |
| 4,108,972 | 8/1978 | Dreyer . |
| 4,127,499 | 11/1978 | Chen et al. |
| 4,161,515 | 7/1979 | Ullman . |
| 4,180,479 | 12/1979 | Siegrist et al. |
| 4,256,834 | 3/1981 | Zuk et al. |
| 4,258,001 | 3/1981 | Pierce et al. |
| 4,259,313 | 3/1981 | Frank et al. |
| 4,271,139 | 6/1981 | Hart . |
| 4,275,333 | 6/1981 | Kagami et al. |
| 4,382,074 | 5/1983 | Hart . |
| 4,388,296 | 6/1983 | Hart . |
| 4,420,444 | 12/1983 | Yamada et al. |
| 4,444,677 | 4/1984 | Edelstein et al. |
| 4,451,434 | 5/1984 | Hart . |
| 4,562,158 | 12/1985 | Schellenberg . |
| 4,604,364 | 8/1986 | Kosak . |
| 4,626,513 | 12/1986 | Burton et al. |
| 4,692,266 | 9/1987 | Costa et al. |
| 4,713,198 | 12/1987 | Simonetti . |
| 4,867,905 | 9/1989 | Wunderly . |
| 4,972,084 | 11/1990 | Potter et al. |
| 5,155,364 | 10/1992 | Fujii . |
| 5,198,364 | 3/1993 | Oikari et al. |
| 5,243,193 | 9/1993 | Suontausta et al. |
| 5,513,102 | 5/1994 | Heidke . |

FOREIGN PATENT DOCUMENTS

| | | |
|---|---|---|
| 0070686 | 1/1983 | European Pat. Off. |
| 0212450 | 8/1985 | European Pat. Off. |
| 0378059 | 7/1990 | European Pat. Off. |
| 1590762 | 5/1970 | France . |
| 57-184990 | 11/1982 | Japan . |
| 63-101787 | 5/1988 | Japan . |
| 6-1971 | 1/1994 | Japan . |
| 1422526 | 1/1976 | United Kingdom . |
| 2007362 | 5/1979 | United Kingdom . |
| 2095830 | 10/1982 | United Kingdom . |
| WO8902088 | 3/1989 | WIPO . |
| WO8902089 | 3/1989 | WIPO . |
| WO9003844 | 4/1990 | WIPO . |
| WO9011524 | 10/1990 | WIPO . |

OTHER PUBLICATIONS

Hart et al, Scintillation-Proximity Assay of Particulate Binding Properties, Biophysical Journal vol. 21, 1978, p. 93a.

(List continued on next page.)

Primary Examiner—Paul M. Dzierzynski
Assistant Examiner—Richard Hanig
Attorney, Agent, or Firm—Arnold, White & Durkee

[57] ABSTRACT

A liquid scintillation medium for homogeneous flow systems which comprises solvent, fluor and optionally surfactant, wherein the solvent comprises benzyltoluene. The solvent may comprise the positional isomers of benzyltoluene, and other solvents such as diphenylethane. This new solvent system for use in flow-through scintillation counting is characterized by low viscosity, high flash point and low vapour pressure.

11 Claims, 3 Drawing Sheets

OTHER PUBLICATIONS

Hart et al, Scintillation Proximity Assay (SPA) of Antigen-Antibody Binding Kinetics, Basic Nuclear Science, Proceedings of 25th Annual Meeting, vol. 19, No. 6, p. 681.

Udenfriend et al, Scintillation proximity radioimmunoassay utilizing 125 I-labeled ligands, Aug. 6, 1985, Proc. Nat'l. Acad. Sci. USA, vol. 82, pp. 8672-8676, Dec. 1985, pp. 8672-8676.

Prydz et al., Fast Radiochromatographic Detection of Tritium with "Liquid" Scintillators at lower Temperatures, Feb. 1970, Analytical Chemistry, vol. 42, No. 2, p. 156.

Gopi Nath Gupta, New Procedure of Micro-Solid Scintillation Counting on Fluor-Coated Glass-Fiber Support in Plastic Minibags for $H^3$, $C^{14}$, $S^{35}$ and $P^{32}$ Samples, The Population Council, the Rockefeller University, New York, N.Y., pp. 753-756.

Peng, Organic Scintillators and Liquid Scintillation Counting, Proceedings of the International Conference on Organic Scintillators and Liquid Scintillation Counting, University of California, San Francisco, Jul. 7-10, 1970, pp. 747-752.

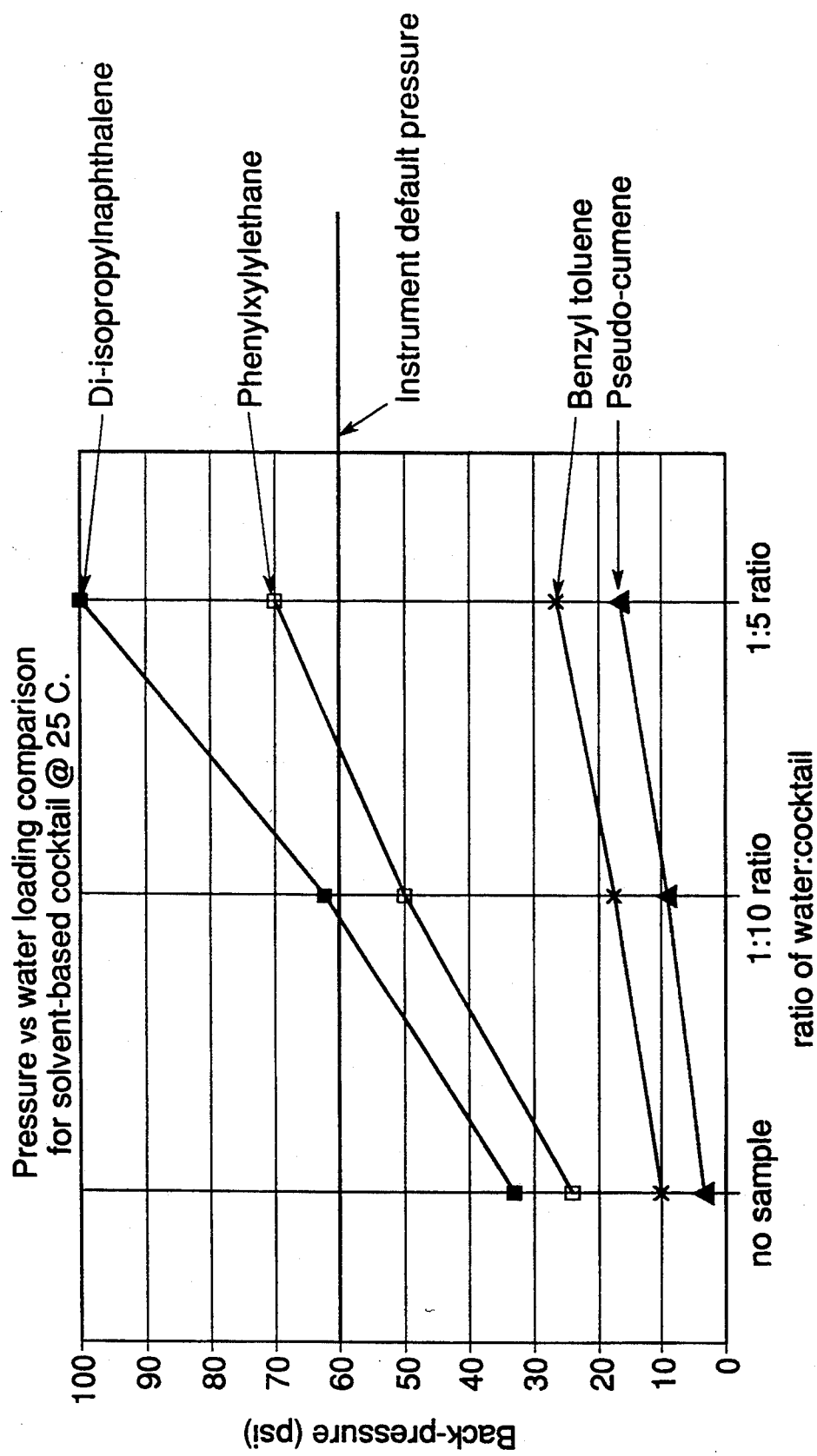

SCINTILLATION COUNTING MEDIUM AND PROCESS

FIELD OF THE INVENTION

This invention is in the field of liquid scintillation counting in flow systems, i.e. radioactive flow detection in the eluate of a High Pressure (or Performance) Liquid Chromatography (HPLC) column.

More in particular, the invention relates to new liquid scintillation media that are specially well suited for use in radioactive flow detectors used in Radio-HPLC equipment.

BACKGROUND OF THE INVENTION

Traditional Liquid Chromatography, High Performance Liquid Chromatography or paper chromatography can be used to separate mixtures of radio-labelled compounds. This results in the isolation of different fractions whose radioactivity can be measured by mixing an aliquot with about two to four times its volume of scintillation liquid (generally referred to as a "scintillation cocktail") and thereafter counting light events produced by the radioactivity of the fraction. Thus liquid scintillation counting is known to be useful for measuring the concentration of a radio-labelled species in a sample or fraction.

Liquid chromatography has long been known to be a capable technique for the separation and analysis of multi-component mixtures. However HPLC has now progressed to be the method of choice for the quantitation of components which could be thermally unstable and non-volatile. This progress can be attributed to improvements to and development of chemically bonded stationary phases. Also solvent programming (gradient elution) is now commonplace in HPLC. In normal bonded phase chromatography the stationary phase is polar (e.g. Silica) and the mobile phase (elution solvent) is non-polar. In this case the non-polar species in the mixture elute first due to their preference for the mobile phase (i.e. exhibit lower retention). With reversed phase chromatography the stationary phase is nonpolar (Octadecyl Silica) and the mobile phase is polar. The elution order may be the reverse observed with normal bonded phase chromatography. Thus it can be seen that HPLC is an effective method for the separation of multi-component mixtures containing radio-labelled species.

Liquid scintillation counting is widely utilised to analyze samples containing radioactively labelled substances. Typically a sample in solution is mixed with a liquid scintillation cocktail and the light events produced from the sample and cocktail mixture are detected according to their energy and number of events. The light events occur when the energy of the particles, emitted form the radioactive isotope component of the sample in solution, is transferred to the molecules of liquid scintillator. This produces a light emission of a specific energy range which is characteristic of the radioactive isotope.

Detecting both the energy and number of light events in a particular energy range provides the information necessary to construct a spectrum. Using this information the radioactive species can be quantitatively analyzed. Liquid scintillation counting and instruments to perform liquid scintillation counting have been widely discussed in a multitude of publications and patents.

The separation and determination of radioactive species which are present in a multi-component mixture can therefore be accomplished using a separation scheme such as HPLC followed by a radio-assay. Collection of column effluent fractions followed by liquid scintillation counting has been used extensively, but has the disadvantage of being time consuming, requires manual manipulation of samples and compromises resolution.

A continuous flow-through radioactivity detector minimises these disadvantages and several such continuous-flow radioactivity monitors have been described in the literature; see, e.g. D. R. Reeve and A. Crozier (1977) J. Chromatogr. 37, 271, "Radioactivity monitor for high performance liquid chromatography"; E. Schram (1970), "Flow monitoring of aqueous solutions containing weak B-emitters" In: The Current Status of Liquid Scintillation Counting, E. D. Bransome, Jr. M.D. (ed.) Grune and Stratton, New York, pp 95–109; and L. R. Snyder and J. J. Kirkland (1979) In: Introduction to Modern Liquid Chromatography, John Wiley & Sons, Inc., New York, pp 158–161. Other relevant publications include Flow through radioactivity detection in HPLC, (Progress in HPLC volume 3), eds. H. Parvez et al. (1988) VSP B.V. and Radiochromatography—The Chromatography and Electrophoresis of Radiolabelled Compounds, T. R. Roberts (1978) Elsevier.

Prior liquid scintillation cocktails known to applicants for use in flow-through cells for measuring radioactivity in fractions from HPLC procedures have certain drawbacks. These scintillation flow cocktails are based on conventionally used solvents which include toluene, xylenes, cumenes, ethylbenzene and pseudocumene. Other solvents which have been used are mono-, di- and tri-alkyl benzenes.

These solvents suffer from the disadvantage that they have relatively high vapour pressures, relatively low flash points and relatively high toxicity. A further disadvantage is that they are not biodegradable. Although these solvents suffer from the above mentioned disadvantages their relatively low viscosity makes theft suitable as media either alone or in conjunction with alcohol-type diluents for scintillation cocktails usable in flow systems.

The advent of safer solvents suggested that all the disadvantages associated with the conventionally used solvents would be overcome. The safer solvents now in use in liquid scintillation counting include di-isopropyl-naphthalene, linear alkylbenzenes and phenylxylylethane and these solvents are characterised by their low toxicity, low flammability, high flash point, low vapour pressure and biodegradability.

These safer solvents have been tried as bases for scintillation cocktails usable in flow systems but they all suffer from having too high a viscosity. The high viscosity causes high back-pressure in the flow system, which can exceed the maximum design pressure of the pump, fittings and even the flow cell.

Another disadvantage of a high viscosity is the inhibition of fast mixing of the scintillation flow cocktail with the HPLC eluent containing the radioactive species, which fast mixing is necessary for an accurate and reproducible determination of the radioactivity. The much higher viscosity of these solvents has therefore precluded their widespread use even after modification with alcohol-type diluents. The amount of diluent necessary to reduce the viscosity to instrument-usable levels results in a substantial reduction in detection sensitivity with respect to counting efficiency.

SUMMARY OF THE INVENTION

It is an object of the invention to provide a scintillation medium for homogeneous flow systems that is based on a solvent system having the advantageous properties of the above-mentioned safer solvents but having a much lower viscosity.

A further object of this invention is to provide a scintillation medium for homogeneous flow systems which is based on a solvent system having a viscosity at 40° C. of about 3.5 cSt (centiStokes) or lower.

Another object of this invention is to provide a scintillation medium for homogeneous flow systems that is liquid at temperatures of use, i.e. at temperatures of from about 5 or 10° C. to about 30 or 35° C.

The invention now provides such a scintillation medium for homogeneous flow systems which comprises benzyltoluene.

SUMMARY DESCRIPTION OF THE DRAWINGS

FIG. 1 contains a graph of viscosity (in centiStokes) versus temperature for various solvents.

FIG. 2 contains a graph of viscosity (in centiStokes) versus water-cocktail mixing ratio for various solvents.

FIG. 3 contains a graph of back-pressure (in psi) versus water-cocktail mixing ratio for various solvents.

DETAILED DESCRIPTION OF THE INVENTION

Figure 1:
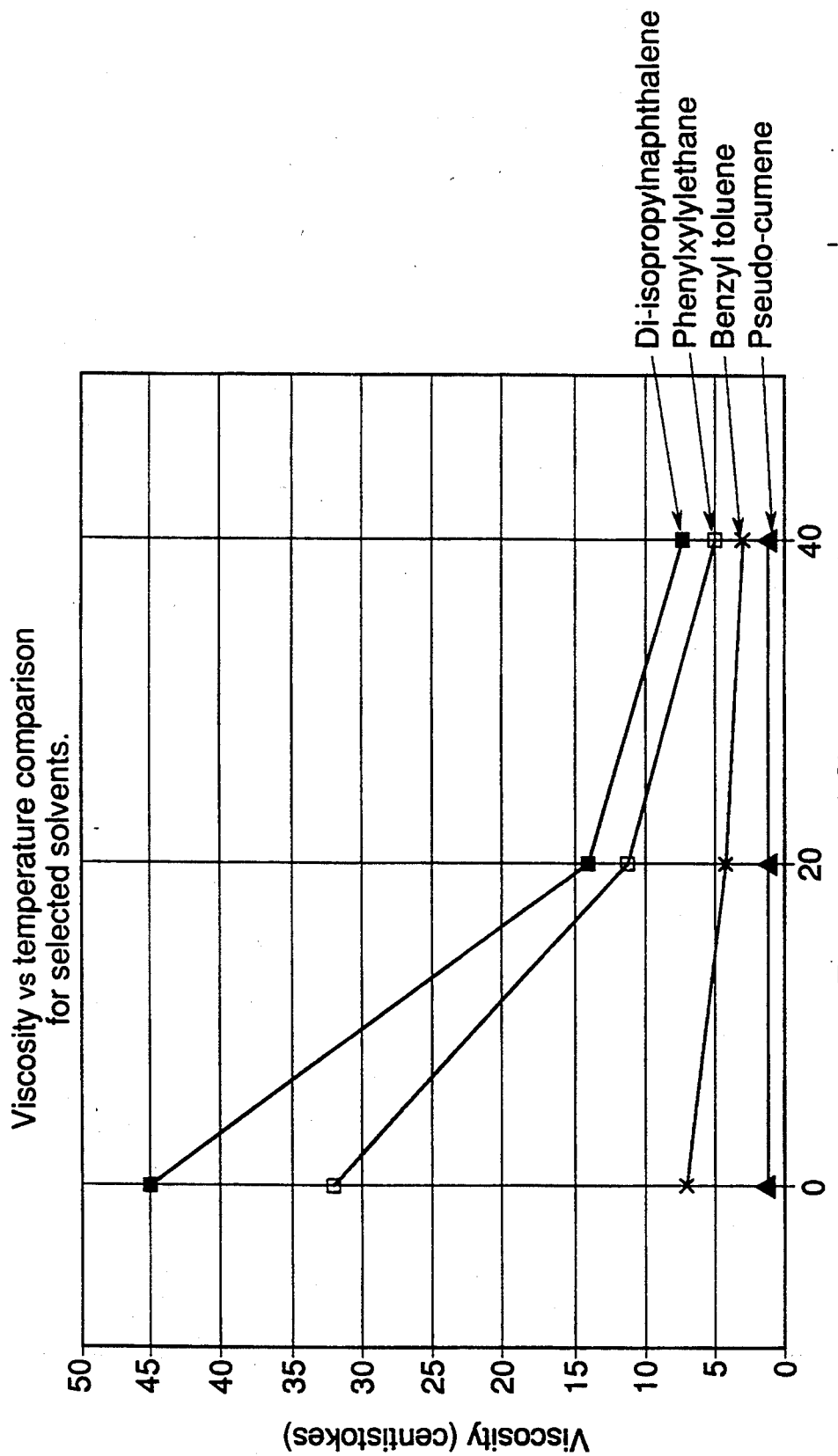

Similar to conventional scintillation media, those of this invention will generally comprise a solvent or solvent system, a fluor or fluor system, and a surfactant or surfactant system. The scintillation media of this invention distinguish from those of the prior art in that they use a solvent or solvent system which comprises at least one benzyltoluene compound.

Benzyltoluene can exist in three different forms that are positional isomers: ortho, meta and para benzyltoluene. These positional isomers may be used individually, or as a mixture. Of the individual isomers, the meta isomer is most preferred in view of its low melting point of about −28° C. Most preferably, however, the solvent system used in the scintillation media of the invention comprises a mixture of positional isomers of benzyltoluene. We prefer the mixture to contain from 0.5 to 25% (wt %) ortho benzyltoluene, e.g. 5%. We prefer the mixture to contain from 5 to 75% (wt %) meta benzyltoluene, e.g. 55%. We prefer the mixture to contain from 5 to 60% (wt %) para benzyltoluene, e.g. 37%. We prefer the mixtures of benzyltoluene which contain ortho, meta and para isomers.

The solvent system used in scintillation media according to the invention preferably has a viscosity of lower than 3.5 cSt at 40° C. Preferably it has a viscosity of less than 3.0 cSt at 40° C. and especially less than 2.8 cSt at 40° C.

The solvent system used in scintillation media according to the invention is preferably liquid at a temperature of 10° C. More preferably the solvent system is liquid at a temperature of 5° C., still more preferably at −10° C. and especially at −20° C.

Preferably, the solvent system used in scintillation media of the invention consists of at least one benzyltoluene without additional scintillation solvents. However, said benzyltoluene may also be used in admixture with one or more other liquid scintillation solvents, e.g. those mentioned above. When used in admixture with other liquid scintillation solvents we prefer the admixture to contain from 0-80 wt %, preferably 2-50 wt %, more preferably 15-45 wt %, e.g. 35 wt % of diphenylethane. The solvent system of scintillation media according to this invention may also comprise another non-scintillating solvent wherein the said non-scintillating solvent may act as a co-solvent, diluent or viscosity modifier. Such non-scintillating solvents that may be used include alcohols, cellosolves and esters.

Scintillation detection media for flow systems according to the invention preferably contain at least one fluor (fluorescent compound). Suitable fluors for scintillation media are well known in the art and include, for example, 2,5-diphenyloxazole, p-terphenyl, 2-(4[1]-t-butylphenyl)-5-(4[11]-biphenyl)-1,3,4-oxadiazole and 2,5-bis (5-t-butyl-benzoxaloyl)-thiophene. The scintillation detection medium may also contain a secondary scintillator (fluor) e.g. 1,4-di-(2-methylstyryl)benzene, 1,4-bis-[4-methyl-phenyl-2-oxazolyl]benzene or 2,5-di(biphenyl)-oxazole.

When the scintillation medium is employed as a liquid scintillation counting medium for flow systems, particularly when aqueous samples are employed, the medium may also contain a surfactant or a mixture of surfactants e.g. non-ionic surfactant such as polyethoxylated alkyl (e.g. nonyl) phenol, and alcohol (e.g. decyl) ethoxylate, anionic surfactant e.g. a dialkyl sulphosuccinate, cationic surfactant or amphoteric surfactant.

The proportion of the various optional components in the scintillation detection medium can vary over a wide range and will be well known to those skilled in the art.

Several methods are available in the prior art for the preparation of benzyltoluene, such as by a Friedel-Crafts reaction between benzylchloride and toluene using a Friedel-Crafts catalyst such as $AlCl_3$, $FeCl_3$, $BF_3$, etc.; by reacting benzyl alcohol with toluene; by dealkylation of benzyl-t aklytoluene; or preferably, because it leads to a greater proportion of the meta isomer, by a disproportionation reaction using a disproportionation catalyst. The preparation of benzyltoluene is described in e.g. EP-A 259.798; DE-A 3.836.780; DE-A 3.544.733; and EP-A 282.083. For a detailed description of the preparation of benzyltoluene, we simply refer to descriptions given in the prior art, such as the above mentioned references.

According to the invention there is provided a scintillating medium for flow systems exhibiting substantially low viscosity and is therefore particularly suited for use in flow systems. This substantially lower viscosity is unexpected given that the compound of the invention—benzyltoluene:

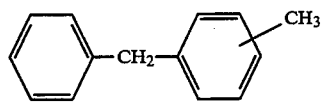

more closely resembles the present generation of safer solvent media e.g. phenylxylylethane:

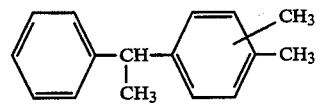

than the conventional solvent media e.g. pseudocumene:

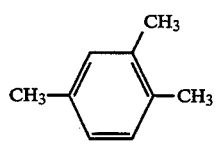

The scintillation media of the invention are advantageous in that they have relatively low viscosities, relatively high flash points, relatively low vapour pressures and are particularly suited for use in flow systems.

The invention is illustrated but in no way limited by the following examples.

EXAMPLE 1

We prepared a liquid scintillation counting medium (flow system) having the following composition:

| | |
|---|---|
| 2,5-diphenyloxazole | 5 g |
| 1,4-di-(2-methylstyryl)benzene | 0.1 g |
| Benzyltoluene (BT) | 1 liter |

The benzyltoluene used in this flow scintillation medium was a mixture of about 94% benzyltoluenes and about 6% diphenylethane. The benzyltoluenes comprised about 8% (by weight) ortho benzyltoluene, about 55% meta benzyltoluene and about 37% para benzyltoluene.

The viscosity of the above liquid scintillation counting medium was compared with the following liquid scintillation solvents prepared with the same fluor concentrations: phenylxylylethane (PXE), di-isopropylnaphthalene (DIN) and pseudocumene (PC). The results (see Table 1) are displayed graphically in FIG. 1.

TABLE 1

| Solvent | Flash point | Viscosity cSt | | |
|---|---|---|---|---|
| | | 0° C. | 20° C. | 40° C. |
| PC | 44° C. | 1.2 | 1 | 0.8 |
| BT | 135° C. | 7 | 4 | 2.6 |
| PXE | 149° C. | 32 | 11 | 5.2 |
| DIN | 140° C. | 45 | 14 | 7 |

EXAMPLE 2

In this example we make a comparison of various solvents.

The following mixtures were prepared and mixed with water at 1:10 and 1:5 ratios to compare the viscosities (EZ Viscosity Cup No.2) at 25° C. The benzyltoluene used was the same as in Example 1.

```
1. 60 parts benzyltoluene (BT)
   40 parts polyethoxylated (n = 7.5) nonylphenol
   5 g/l 2,5-diphenyloxazole
   0.1 g/l 1,4-di-(2-methylstyryl)benzene
2. 60 parts pseudocumene (PC)
   40 parts polyethoxylated (n = 7.5) nonylphenol
   5 g/l 2,5-diphenyloxazole
   0.1 g/l 1,4-di-(2-methylstyryl)benzene
3. 60 parts phenylxylylethane (PXE)
   40 parts polyethoxylated (n = 7.5) nonylphenol
   5 g/l 2,5-diphenyloxazole
   0.1 g/l 1,4-di-(2-methylstyryl)benzene
4. 60 parts di-isopropylnaphthalene (DIN)
   40 parts polyethoxylated (n = 7.5) nonylphenol
   5 g/l 2,5-diphenyloxazole
   0.1 g/l 1,4-di-(2-methylstyryl)benzene
```

TABLE 2

| | Viscosity (CentiStokes) at 25° C. | | | |
|---|---|---|---|---|
| | PC | BT | PXE | DIN |
| No sample | 9 | 15 | 31 | 41 |
| 1:10 ratio | 15 | 23 | 70 | 100 |
| 1:5 ratio | 25 | 36 | 110 | 190 |

Figure 2:
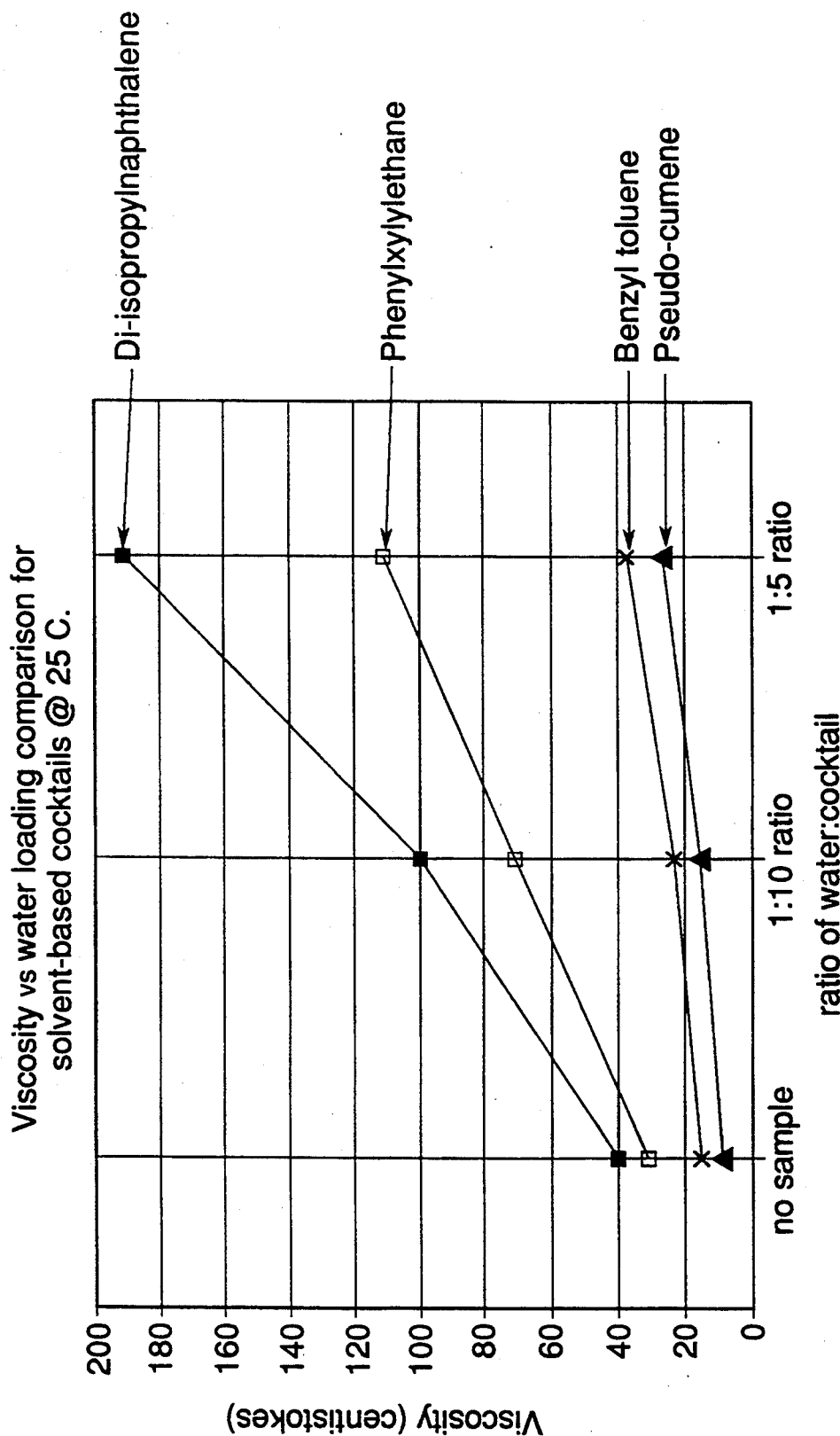

These results demonstrate that benzyltoluene more closely approximates to pseudocumene than phenylxylylethane in terms of viscosity when used in (or as) scintillation media for flow cocktails. These results are displayed graphically in FIG. 2.

The mixtures shown in the above Table 2 were then pumped through a 400 μl Flow Cell in a Radiomatic Flo-One A-500 Radio-Chromatography detector at a fixed rate of 4 ml/min to see what back-pressure is produced. The instrument has a default back-pressure setting of 60 psi (0.4 MPa) which protects the cell and fittings against high pressure-derived leaks and even cell fracture.

The results (Table 3) show that benzyltoluene more closely approximates to pseudocumene than phenylxylylethane in generated back-pressure when pumped through a radio-chromatography detector. These results are displayed graphically in FIG. 3.

TABLE 3

| | Back pressure (psi) | | | |
|---|---|---|---|---|
| | PC | BT | PXE | DIN |
| No sample | 4 | 10 | 24 | 33 |
| 1:10 ratio | 9 | 17 | 50 | 62 |
| 1:5 ratio | 16 | 26 | 70 | >80 |

We claim:

1. A scintillation medium for homogeneous flow systems which comprises solvent, fluor and optionally surfactant, wherein said solvent comprises benzyltoluene.

2. A scintillation medium according to claim 1 wherein said solvent has a viscosity of lower than 3.5 centistokes at 40° C.

3. A scintillation medium according to claim 2 wherein said solvent has a viscosity of lower than 3.0 centistokes at 40° C.

4. A scintillation medium according to claim 1 wherein said benzyltoluene comprises a mixture of positional isomers of benzyltoluene.

5. A scintillation medium according to claim 4 wherein said positional isomers include ortho, meta and para benzyltoluene.

6. A scintillation medium according to claim 5 wherein said benzyltoluene comprises from 0.5 to 25% w/w ortho benzyltoluene, from 5 to 75% w/w meta benzyltoluene and from 5 to 60% w/w para benzyltoluene.

7. A scintillation medium according to claim 1 wherein said solvent is a liquid at a temperature of 10° C.

8. A scintillation mixture according to claim 1 wherein said solvent includes diphenylethane.

9. A scintillation mixture according to claim 1 wherein said fluor is selected from the group consisting of 2,5-diphenyloxazole, p-terphenyl, 2-(4$^1$-t-butylphenyl)-5-(4[11]-biphenyl)-1,3,4-oxadiazole and 2,5-bis (5-t-butylbenzoxaloyl)-thiophene.

10. A scintillation mixture according to claim 1 which contains a surfactant.

11. A method of flow-through radioactivity detection wherein a liquid sample stream is mixed with a liquid scintillation medium and the mixture is passed through a radioactivity detection cell which detects the light events produced by the radioactivity in the mixture, wherein said liquid scintillation medium is a scintillation medium for homogeneous flow systems according to claim 1.

* * * * *